United States Patent
Parthasarathy et al.

(10) Patent No.: US 7,921,427 B2
(45) Date of Patent: Apr. 5, 2011

(54) METHOD AND SYSTEM FOR PROCESSING MESSAGES IN AN APPLICATION CLUSTER

(75) Inventors: Ramesh Parthasarathy, Karnataka (IN); Binod P. Gangadharan, Karnataka (IN); Sivakumar Thyagarajan, Karnataka (IN)

(73) Assignee: Oracle America, Inc., Redwood City, CA (US)

( * ) Notice: Subject to any disclaimer, the term of this patent is extended or adjusted under 35 U.S.C. 154(b) by 1043 days.

(21) Appl. No.: 11/728,913

(22) Filed: Mar. 27, 2007

(65) Prior Publication Data

US 2008/0244613 A1    Oct. 2, 2008

(51) Int. Cl.
G06F 7/00    (2006.01)

(52) U.S. Cl. .................. 719/313; 719/317; 709/225

(58) Field of Classification Search .................. None
See application file for complete search history.

(56) References Cited

U.S. PATENT DOCUMENTS

| | | |
|---|---|---|
| 7,185,061 B1 | 2/2007 | Gopal et al. |
| 7,305,582 B1 | 12/2007 | Moser et al. |
| 7,568,009 B2 | 7/2009 | Kirstein |
| 2003/0236923 A1* | 12/2003 | Jeyaraman et al. ........... 709/318 |
| 2004/0078440 A1* | 4/2004 | Potter et al. ................... 709/206 |
| 2004/0078495 A1* | 4/2004 | Mousseau et al. ................. 710/1 |
| 2004/0240462 A1* | 12/2004 | T V et al. ....................... 370/432 |
| 2005/0120095 A1 | 6/2005 | Aman et al. |
| 2007/0208814 A1 | 9/2007 | Czotscher et al. |

OTHER PUBLICATIONS

P.G., Binod et al.; User Guide to Generic Resource Adapter for JMS; Dec. 29, 2005; <https://genericjmsra.dev.jaca.net/docs/userguide/userguide.html>, pp. 1-9 (last visited Jan. 12, 2007); (9 pages).
Haase, K.; Java™ Message Service API Tutorial; Sun Microsystems, Inc.; Chapter 3 (pp. 21-32); Chapter 6 (pp. 73-101); Chapter 9 (pp. 129-180); Chapter 10 (pp. 181-214); Date: 2002; (126 pages).

* cited by examiner

*Primary Examiner* — Andy Ho
*Assistant Examiner* — Shih-Wei Kraft
(74) *Attorney, Agent, or Firm* — Osha • Liang LLP

(57) ABSTRACT

A method for processing a message that includes receiving the message by a plurality of resource adapters (RA). The method includes calculating a selector string using an application instance selection portion of the message, determining whether the selector string calculated by the RA identifies the application instance corresponding to the RA, transmitting the message to the application instance corresponding to the RA when the selector string calculated by the RA identifies the application instance, and discarding the message when the selector string calculated by the RA does not identify the application instance corresponding to the RA, where one RA transmits the message to the application instance corresponding to the RA and the remaining RAs discard the message.

16 Claims, 8 Drawing Sheets

METHOD AND SYSTEM FOR PROCESSING MESSAGES IN AN APPLICATION CLUSTER

CROSS-REFERENCE TO RELATED APPLICATIONS

The present application contains subject matter that may be related to the subject matter in U.S. patent application Ser. No. 11/728,625, entitled, "Method and System for Processing a Message by a Message Provider", filed on Mar. 27, 2007 and assigned to a common assignee. The aforementioned patent application is hereby incorporated by reference.

BACKGROUND OF INVENTION

A Message Services Application Programming Interface (API) provides an interface for communication between clients (e.g., a software application or a component thereof). The API is a Message Oriented Middleware (MOM) API that provides mechanisms for creating, sending, receiving, and reading messages using one of two models: (i) a point-to-point (i.e. queuing) model; and (ii) a publish-subscribe (i.e. topic) model.

In the point-to-point model, a producer client (i.e., a sending client) posts a message to a queue and a consumer client (i.e., a receiving client) consumes (i.e., receives and processes) the message from the queue. In the point-to-point model, the producer client is not aware of the consuming client, or even if there is a consumer client registered for the queue. The producer client sends the message to a particular queue, where the message will be consumed at a later time by only one consumer client. The producer client does not have control over if and when the message will be received and processed by a consumer client. Thus, the point-to-point model is one-to-one because only one consumer client consumes the posted message. Further, the consumer client typically acknowledges the receipt of the message to the producer client.

In the publish-subscribe model, a publisher client publishes a message to a topic by sending the message to the topic and a subscriber client that is subscribed to the topic may receive the message. In addition, in the publish-subscribe model, multiple subscriber clients may subscribe to the same topic. Thus, all subscriber clients subscribed to the topic receive the same message when the message is published to the topic. Each subscriber client then processes the same message locally.

SUMMARY OF INVENTION

In general, in one aspect, the invention relates to a method for processing a message that includes receiving the message by a plurality of resource adapters (RA), wherein each RA corresponds to a different application instance of a plurality of application instances, calculating, by each RA of the plurality of RAs, a selector string using an application instance selection portion of the message, determining, by each RA of the plurality of RAs, whether the selector string calculated by the RA identifies the application instance corresponding to the RA, transmitting the message, by each RA of the plurality of RAs, to the application instance corresponding to the RA when the selector string calculated by the RA identifies the application instance, and discarding the message, by each RA of the plurality of RAs, when the selector string calculated by the RA does not identify the application instance corresponding to the RA, wherein one RA of the plurality of RAs transmits the message to the application instance corresponding to the RA and the remaining RAs of the plurality of RAs discard the message.

In general, in one aspect, the invention relates to a system for processing messages, the system that includes a plurality of application instances, wherein each application instance corresponds to a different RA of a plurality of RAs, and the plurality of RAs, wherein each RA of the plurality of RAs receives a message that includes an application instance selection portion, calculates a selector string based on the application instance selection portion, transmits the message to the application instance corresponding to the RA when the selector string identifies the application instance, and discards the message when the selector string does not identify the application instance, wherein one RA of the plurality of RAs transmits the message to the corresponding application instance and the remaining RAs of the plurality of RAs discard the message.

In general, in one aspect, the invention relates to a computer readable medium that includes software instructions embodied therein for causing a computer system to receive a message by a plurality of resource adapters (RA) each corresponding to a unique identifier, calculate, by each RA of the plurality of RAs, a selector string using a portion of the message, determine, by each RA of the plurality of RAs, whether the selector string calculated by the RA identifies the unique identifier corresponding to the RA, process the message, by each RA of the plurality of RAs when the selector string calculated by the RA identifies the unique identifier corresponding to the RA, wherein one RA of the plurality of RAs processes the message and the remaining RAs of the plurality of RAs do not process the message, wherein the message does not include information specific to the one RA processing the message, and wherein the one RA does not communicate with the remaining RAs in calculating the selector string.

Other aspects and advantages of the invention will be apparent from the following description and the appended claims.

DETAILED DESCRIPTION

Figure 1:
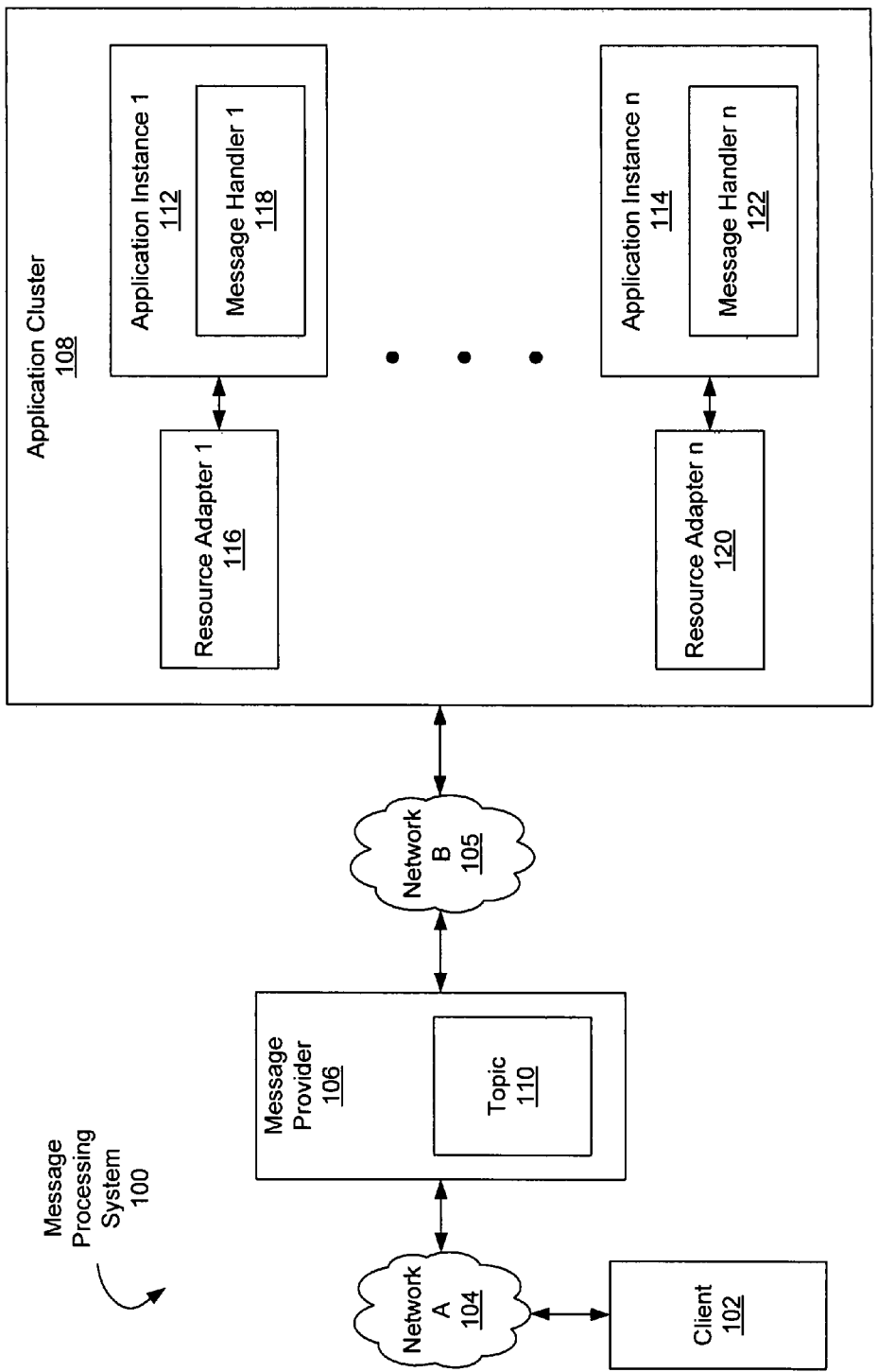
FIG. 1 shows a system in accordance with one or more embodiments of the invention.

Exemplary embodiments of the invention will now be described in detail with reference to the accompanying figures. Like items in the figures are denoted with like reference numerals for consistency.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention relate to multiple instances of an application deployed as an application cluster for increasing processing throughput capability.

In some embodiments, the application may be message driven and each application instance may be in operative communication with a resource adapter that provides connectivity between the application instance and one or more message providers. Each application instance may comprise a message handler for handling messages cooperatively with the resource adapter. In some embodiments of the invention, the resource adapter may be a Java™ Messaging Service (JMS) resource adapter (JMSRA), the message handler may be a message driven bean (MDB), and the messages may be JMS messages. Java™ is a trademark of Sun Microsystems™, Inc. located in Santa Clara, Calif. In other embodiments of the invention, the resource adapter, the message handler, and the messages may be implemented according to a modular architecture other than the JMS messaging system and MDBs.

Embodiments of the invention relate to a method and system for processing messages when a topic model is used for communication. Specifically, one or more embodiments of the invention relate to a method and system for processing messages in which multiple instances of an application deployed on an application cluster are subscribed to a topic. In some embodiments of the invention, when the topic sends a message to the multiple application instances, only one application instance processes the message instead of all application instances.

FIG. 1 shows a message processing system (100) in accordance with one or more embodiments of the invention. As shown FIG. 1, the message processing system (100) includes a client (102), one or more networks (e.g., Network A (104), Network B (105)), a message provider (106), and an application cluster (108). Each of these components is described below.

In one or more embodiments of the invention, the one or more networks (e.g., Network A (104), Network B (105)) may be any public and/or private network which is wired, wireless, or is formed of any combination thereof. For example, Network A (104) may be a Local Area Network (LAN), a Metropolitan Area Network (MAN), a Wide Area Network (WAN), or any combination of a LAN, MAN and WAN.

The networks (e.g., Network A (104), Network B (105)) connect a client (102) and an application cluster (108) to a message provider (106) in accordance with one or more embodiments of the invention. In some embodiments of the invention, the client (102) may be configured to publish messages (described in more detail below in relation to FIG. 2). Specifically, a client (102) includes functionality to send a message to a topic (110). In at least one embodiment of the invention, the client (102) may generate and send a message when a predetermined event occurs. For example, in an enterprise application system for a manufacturing facility of a company, a client running the "raw materials inventory" software application may send a message when a "shortage of raw material X" event occurs.

In one or more embodiments of the invention, the client (102) is a standalone client. Alternatively, the client (102) may be an application instance in an application cluster (described below). Specifically, the client (102) may be configured to receive and process messages.

Continuing with FIG. 1, an application cluster (108) may include one or more application instances. In some embodiments of the invention, multiple instances of an application are deployed as an application cluster for increasing the processing throughput capability. For example, the application may be message driven and include a message handler for handling messages. In some embodiments of the invention, the message handler may be an MDB and the messages may be JMS messages. In other examples, the modular element and messages may be implemented according to a modular architecture other than the MDB and JMS.

Application instances (e.g., application instance 1 (112), application instance n (114)) may be deployed on one or more servers included in the application cluster (108). In some embodiments of the invention, the application instances (e.g., application instance 1 (112), application instance n (114)) may be Java 2 Enterprise Edition (J2EE™) compliant and may include MDBs. J2EE™ is a trademark of Sun Microsystems™ Inc. located in Santa Clara, Calif. Further, in one or more embodiments of the invention, the application instances (e.g., application instance 1 (112), application instance n (114)) may be deployed on Sun Java™ System Application Servers developed by Sun Microsystems, Inc., BEA WebLogic® Servers developed by BEA Systems, Inc., WebSphere® Application Servers developed by International Business Machines Corporation, etc. WebLogic® is a registered trademark of BEA Systems, Inc., located in San Jose, Calif. WebSphere® is a registered trademark of International Business Machines Corporation located in Armonk, N.Y.

Each application instance (e.g., application instance 1 (112), application instance n (114)) is an instance of the same software application. The application instances (e.g., application instance 1 (112), application instance n (114)) include functionality to receive and process messages. Processing a message may include updating a storage unit, such as a file or a database, transmitting a result to a client, performing an action such as updating the inventory of the client, etc.

In one or more embodiments of the invention, each application instance (112, 114) is identified by an instance identifier (e.g., 0, 1, 2, etc.). An instance identifier uniquely identifies an application instance (e.g., application instance 1 (112), application instance n (114)) within the application cluster (108). Specifically, in one or more embodiments of the invention, the instance identifiers of application instances (e.g., application instance 1 (112), application instance n (114)) in the application cluster are positive integers. For example, the instance identifier of each application instance (112, 114) is an integer between 0 and N-1, where N is the total number of application instances deployed on the application cluster (108).

In one or more embodiments of the invention, the instance identifier is stored as a Java Virtual Machine (JVM) property that uniquely identifies each application instance (e.g., application instance 1 (112), application instance n (114)). In one or more embodiments of the invention, each application instance (e.g., application instance 1 (112), application instance n (114)) stores the instance identifier for the application instance. Further, the instance identifier may be stored by a resource adapter (RA) (e.g., RA 1 (116), RA n (120)) (described below) or a message handler (e.g., Message Handler 1 (118), Message Handler n (122)) (described below) included in the application instance (e.g., application instance 1 (112), application instance n (114)).

The instance identifier may be generated at virtually any time. For example, the instance identifier may be created at the time of deployment of the application cluster (108), at the time of deployment of an application instance (e.g., application instance 1 (112), application instance n (114)), or at any time the application instances (e.g., application instance 1 (112), application instance n (114)) deployed in the application cluster (108) change. For example, when a server executing an application instance fails, a new instance identifier may be generated for each application instance (e.g., application instance 1 (112), application instance n (114)).

In one or more embodiments of the invention, each application instance (e.g., application instance 1 (112), application instance n (114)) is operatively connected to a RA (e.g., RA 1 (116), RA n (120)). The RA (e.g., RA 1 (116), RA n (120)) includes functionality to receive messages and to subscribe to a topic (110) (described below). In one or more embodiments of the invention, each RA (e.g., RA 1 (116), RA n (120)) includes mutual exclusion logic to determine whether the application instance (e.g., application instance 1 (112), application instance n (114)) corresponding to the RA (e.g., RA 1 (116), RA n (120)) should process a received message.

The mutual exclusion logic assures that only one application instance (e.g., application instance 1 (112), application instance n (114)) is selected to process the message. In some embodiments of the invention, the mutual exclusion logic performs the determination without requiring that the RAs (e.g., RA 1 (116), RA n (120)) communicate with each other. Further, each RA (e.g., RA 1 (116), RA n (120)) includes functionality to transmit the message to the corresponding application instance (e.g., application instance 1 (112), application instance n (114)) for processing if the mutual exclusion logic determines that the application instance should process the message.

In one or more embodiments of the invention, each RA (e.g., RA 1 (116), RA n (120)) also includes functionality to disable the mutual exclusion logic such that the corresponding application instance (e.g., application instance I (112), application instance n (114)) receives all messages from the topic (110). In one or more embodiments of the invention, disabling the mutual exclusion logic may be accomplished by setting a flag stored in the RA (e.g., RA 1 (116), RA n (120)) to false. In such a scenario, the application instance (e.g., application instance 1 (112), application instance n (114)) may include functionality to enable selective processing of messages. In particular, such functionality may include using a custom selector (described below) to enforce mutual exclusion of processing of the messages amongst the application instances (e.g., application instance 1 (112), application instance n (114)). Further, in one or more embodiments of the invention, the flag may also be stored by a component of the system (100) other than the RA (e.g., RA 1 (116), RA n (120)) (e.g., an application instance (e.g., application instance 1 (112), application instance n (114)), a message handler (e.g., Message Handler 1 (118), Message Handler n (122)), etc.)

Continuing with FIG. 1, in one or more embodiments of the invention, each application instance (e.g., application instance 1 (112), application instance n (114)) includes a message handler (e.g., Message Handler 1 (118), Message Handler n (122)). A message handler (e.g., Message Handler I (118), Message Handler n (122)) includes functionality to subscribe to the topic (110) (described below), listen for new messages, and process messages. Further, in one or more embodiments of the invention, the message handler (e.g., Message Handler 1 (118), Message Handler n (122)) stores a total instance count of the total number of application instances (e.g., application instance 1 (112), application instance n (114)) deployed on the application cluster (108). Alternatively or additionally, the total instance count may be stored by each application instance (e.g., application instance 1 (112), application instance n (114)) and/or the corresponding RA (e.g., RA 1 (116), RA n (120)).

In one or more embodiments of the invention, each message handler (e.g., Message Handler 1 (118), Message Handler n (122)) includes a custom selector. A custom selector is mutual exclusion logic for determining whether the application instance including the message handler should process the message. Alternatively, the custom selector may be stored by any other component of the system (100) (e.g., an application instance, a RA, etc.)

A message provider (106) (i.e., a message broker) acts as an intermediary between the client (102) and an application cluster (108). More specifically, messages may be sent to the message provider (106) by a client (102) and later transmitted from the message provider (106) to the application cluster (108).

In one or more embodiments of the invention, the message provider (106) may be any open source or proprietary Message Oriented Middleware (MOM). For example, a message provider (106) may be ActiveMQ developed by Apache, JBoss® Messaging developed by RedHat® Middleware, LLC, Open Message Queue or Sun Java System Message Queue developed by Sun Microsystems™ Inc., Enterprise Messaging Service™ (EMS) developed by TIBCO® Software Inc., Websphere® MQ developed by International Business Machines Corporation, SonicMQ® developed by Sonic Software®, Oracle® Enterprise Messaging Services (OEMS) developed by Oracle® Corporation, MantaRay developed by Coridan located in Santa Clara, Calif., FioranoMQ™ developed by Fiorano® Software, Inc, etc. JBoss® is a registered trademark of RedHat® Middleware, LLC located in Raleigh, N.C. Enterprise Messaging Service™ is a trademark of TIBCO® Software Inc. located in Palo Alto, Calif. WebSphere® is a registered trademark of International Business Machines Corporation located in Armonk, N.Y. SonicMQ® is a registered trademark of Sonic Software® located in Bedford, Mass. Oracle® is a registered trademark of Oracle® Corporation located in Redwood Shores, Calif. Coridan is located in Santa Clara, Calif. FioranoMQ™ is a trademark and Fiorano® is a registered trademark of Fiorano® Software, Inc located in Los Gatos, Calif.

In one or more embodiments of the invention, the message provider (106) includes a topic (110) that stores and transmits messages published to a topic. A topic is a distribution mechanism whereby a message sent to the topic may be distributed to multiple registered listeners (i.e., application instances that have subscribed to the topic). A topic may be an object which represents a particular subject matter of the messages. For example, a topic may represent weather for a specific region, invoice requests, etc. In one or more embodiments of the invention, the topic (110) follows the publish/subscribe model of the JMS API. In one or more embodiments of the invention, the topic (110) includes functionality to manage requests from subscribers (e.g., application instance 1 (112), application instance n (114)) to subscribe to the topic (110) in order to receive messages published to a topic corresponding to the topic (110).

In one or more embodiments of the invention, the topic (110) may include a storage mechanism (e.g., optical hard disk drive, flash memory, Random Access Memory (RAM), removable storage, etc.) to store messages. Further, in one or more embodiments of the invention, the topic (110) may communicate with the message provider (106) over a network and may reside on a separate server from the message provider (106).

Figure 2:
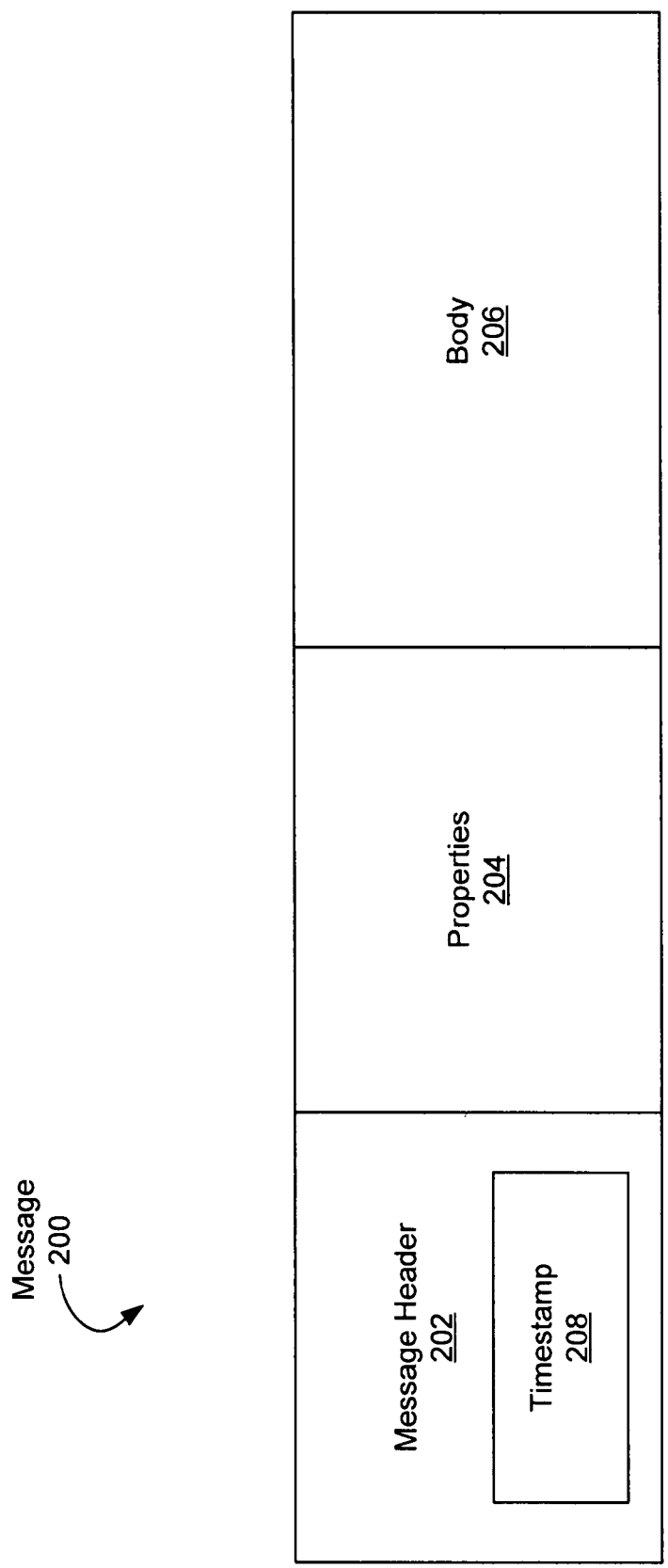
FIG. 2 shows a message in accordance with one or more embodiments of the invention.

FIG. 2 shows a message (200) in accordance with one or more embodiments of the invention. A message may be an object that includes data which is being transferred between clients. In some embodiments of the invention, a message may be a JMS message. As shown in FIG. 2, a message (200) includes a message header (202), properties (204) and a body (206) in accordance with one or more embodiments of the invention. Each of these components is described below.

In one or more embodiments of the invention, the message header (202) includes a set of pre-defined fields that include values that sender clients and receiver clients can set/update/use to identify and/or route the message (200). For example, the message header (202) may include a message identifier field that identifies the message, a destination field that identifies the topic of the message, etc. Further, the message header (202) may include a timestamp (208). In some embodiments of the invention, the timestamp (208) identifies the time when the message was received by a message provider. Alternatively, the timestamp (208) may identify the time at which the message was sent by the client. Further, in another alternative, the timestamp (208) may not exist.

In addition to the message header (202), the message (200) may also include properties (204). In one or more embodiments of the invention, the properties (204) are custom properties of the message (200). For example, the properties (204) may be used to provide compatibility with non-messaging systems, to define information related to a custom selector, to define one or more unique values to be used in calculating a selector string, etc. Here, the string is an ordered sequence of symbols. In one or more embodiments of the invention, the properties (204) are optional.

In one or more embodiments of the invention, the body (206) includes the actual content of the message (200). For example, the message (200) may be a text message incorporating contents of an Extensible Markup Language (XML) file, a stream message incorporating a stream of primitive values in the Java programming language which are filled and read sequentially, a byte message incorporating a stream of uninterpreted bytes to literally encode the body to match an existing message format, etc. In one or more embodiments of the invention, the body (206) of the message (200) is also optional.

Figure 3:
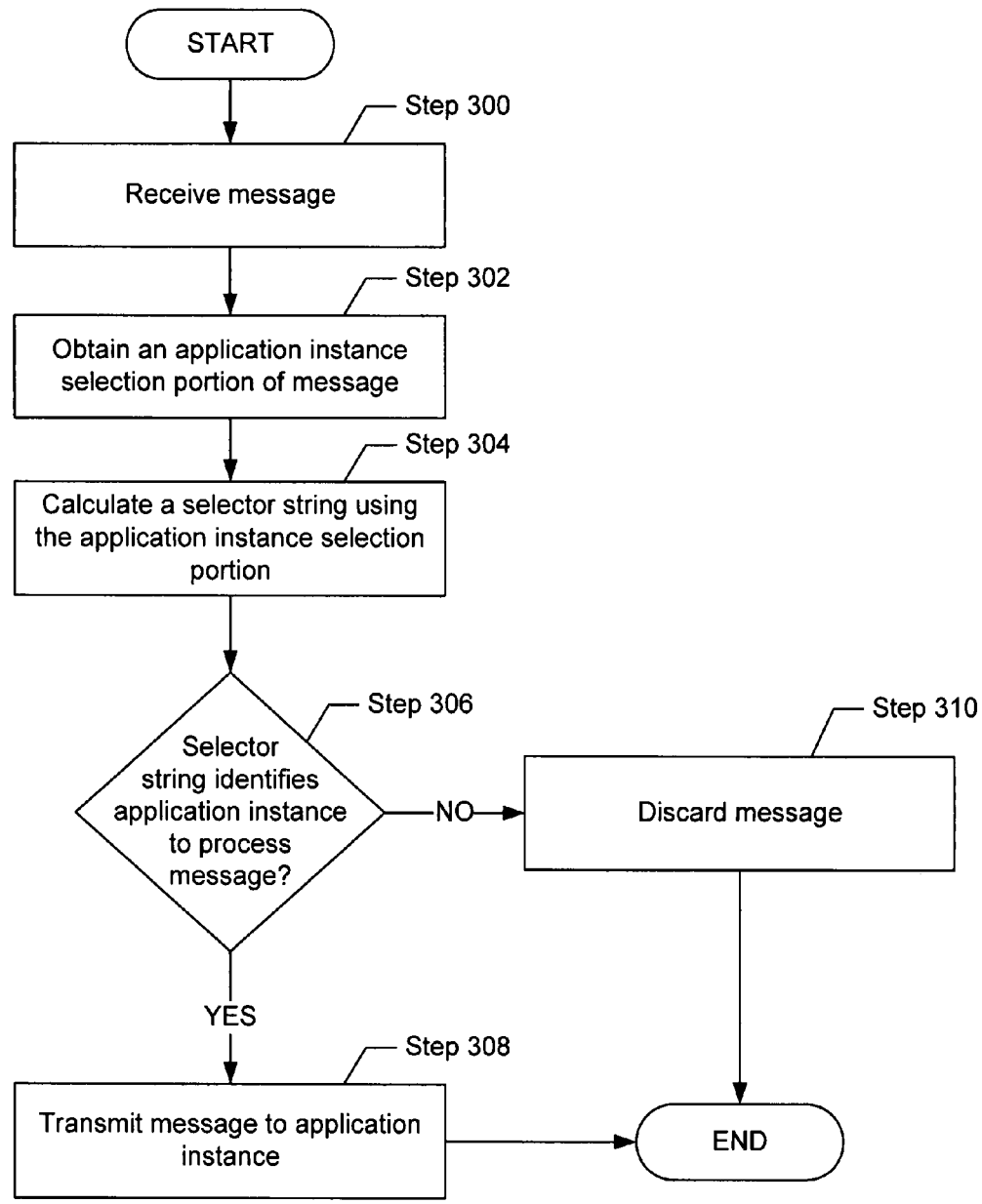
FIG. 3 shows a flowchart in accordance with one or more embodiments of the invention.

FIG. 3 shows a flowchart of processing a message by a RA in accordance with one or more embodiments of the invention. While the various steps in this flowchart are presented and described sequentially, one of ordinary skill will appreciate that some or all of the steps may be executed in different orders and some or all of the steps may be executed in parallel.

Initially, one or more application instances subscribe to a topic (not shown). Specifically, an application instance may subscribe to the topic using the RA associated with the application instance. The RA sends a subscription request to the message provider. In response to the subscription request, the message provider registers the application instance as a registered listener of the topic in accordance with one or more embodiments of the invention.

When a message is received by the topic, the message provider broadcasts the message to all registered listeners of the topic. Thus, a message is received by the RA (Step 300).

Next, the RA obtains an application instance selection portion of the message (Step 302). The application instance selection portion may be a portion of the message that is used to select an application instance. For example, the application instance selection portion may be a timestamp, a hash value of the message or portion thereof, an identifier of the sender of the message, a security code in the message, etc.

Next, the instance identifier of the application instance connected with the RA and the total instance count is obtained (Step 304). In one or more embodiments of the invention, the RA may be a JMSRA. In such embodiments, the instance identifier may be obtained by querying the JVM property corresponding to the instance identifier of the application instance connected to the RA. In some embodiments of the invention, the total instance count may be obtained by querying the message handler of the application instance. Further, in one or more embodiments of the invention, the instance identifier and the total instance count are accessible to the RA through a standard interface. Once the instance identifier and total instance count is obtained, in one or more embodiments of the invention, the RA stores the instance identifier and the total instance count for use in handling future messages.

Alternatively, in one or more embodiments of the invention, the message handler and/or the RA may be configured to store both the instance identifier and the total instance count. For example, configuration variables of the RA and/or message handler may be used to maintain the instance identifier of the corresponding application instance and the total instance count.

Next, the RA calculates a selector string using the total instance count and the application instance selection portion of the message (Step 304). In one or more embodiments of the invention, the RA performs a mod operation using the application instance selection portion and the total instance count to calculate the selector string. In particular, the RA calculates the value of the application instance selection portion divided by the total instance count. The remainder of the aforementioned calculation is the selector string.

Alternatively, in one or more embodiments of the invention, the mutual exclusion logic of the RA may be disabled. Specifically, a flag of the RA may be set as false (e.g., by changing the value of a Boolean variable corresponding to the flag). In such scenario, after determining that the mutual exclusion logic is disabled, the RA may obtain custom selection logic from the message handler of the application instance connected to the RA. Using the custom selection logic, the selector string is calculated. For example, the custom selection logic may specify that rather than using a modulo operation, the application instance that is on a server which is physically closest to the client which sent the message should process the message. Accordingly, in the example, if three application instances exist that execute on servers in Norway, India, and Venezuela, and the client is in Brazil, than the selector string indicates that application instance in Venezuela processes the message.

Continuing with the discussion of FIG. 3, a determination is made whether the selector string identifies the application instance connected to the RA (Step 306). In one or more embodiments of the invention, the RA determines whether the value of the selector string is equal to the instance identifier of the connected application instance. If the value of the selector string equals the instance identifier, than the selector string identifies the application instance. In an alternative embodiment of the invention, the selector string may be a Boolean variable that has at most two values (i.e., true and false, 0 and 1, or any form thereof). In such alternative embodiment, a determination is made whether the Boolean variable specifies that the application instance should process the message (i.e., identifies the application instance).

If the selector string identifies the application instance, the message is transmitted to the application instance corresponding to the RA (Step 308). Accordingly, the application instance processes the message. Specifically, in one or more embodiments of the invention, the message handler of the application instance connected to the RA processes the received message.

Alternatively, if the instance identifier of the application instance connected to the RA does not identify the application instance, the RA discards the message (Step 310). For example, the message may be ignored and/or destroyed.

Alternatively, the comparison performed in Step 306 may lead to a Boolean result (e.g., zero if application instance should process the message and one otherwise). The Boolean result may be appended to the message by the RA and the message may be transmitted to the application instance corresponding to the RA regardless of the potential outcome of the determination. For example, the application instance may be configured to receive all messages but disregard the messages which have a "1" appended by the RA to the message.

If any changes occur in the application instances deployed on the application cluster (e.g., stop an application instance, deploy a new application instance, etc.), the application instances may be redeployed to update the total instance count and the instance identifier values of each of the application instances. Alternatively, instance identifiers and the total instance count may be reassigned or redistributed to affected application instances, message handlers, and/or RAs when changes to the deployed application instances occur.

Figure 4A:
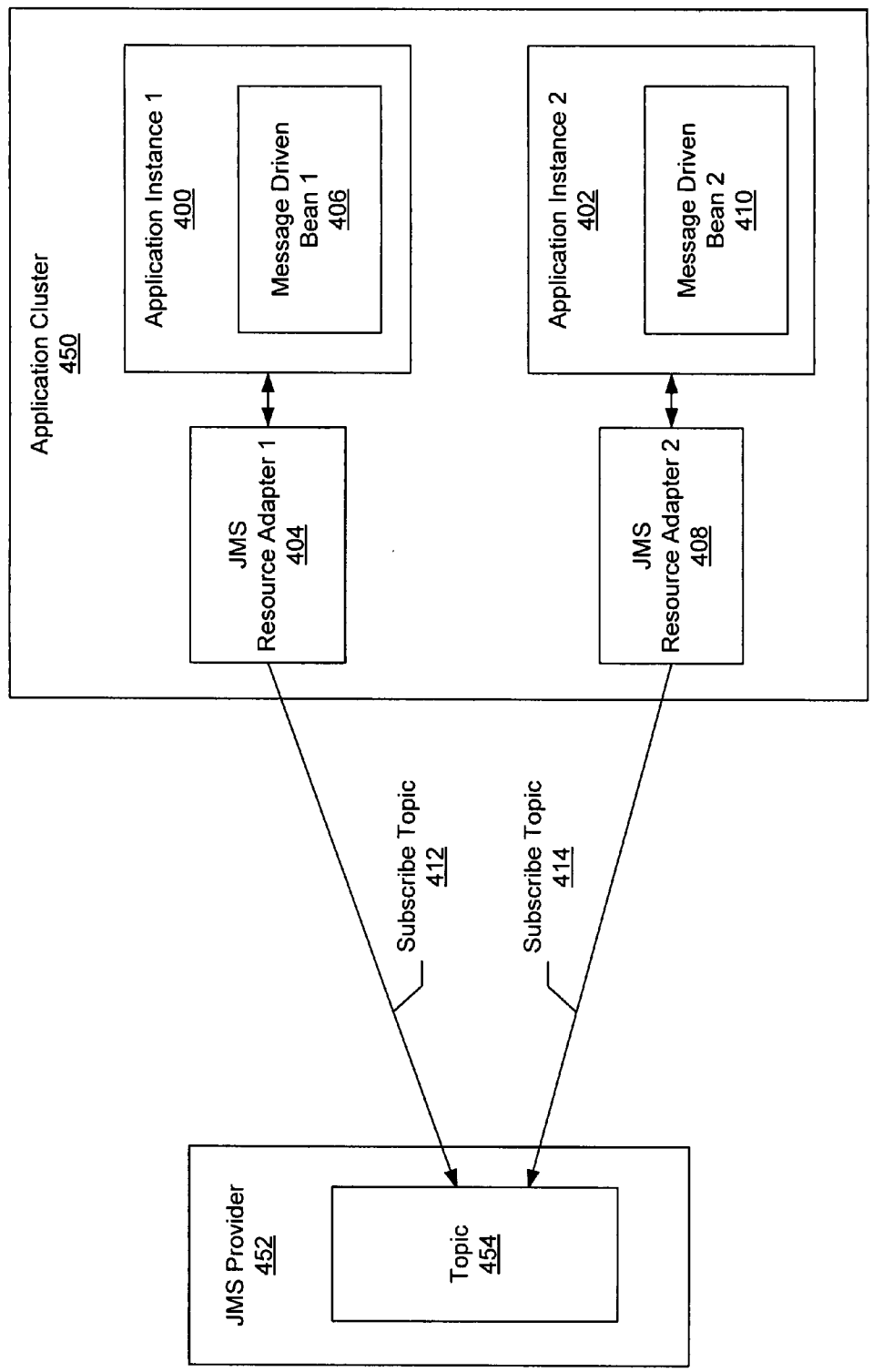
FIGS. 4A-4D show an example in accordance with one or more embodiments of the invention.

FIGS. 4A-4D show an example flow of processing of a message in accordance with one or more embodiments of the invention. FIG. 4A shows an example application cluster (450) and JMS provider (452). For the following example, consider the scenario in which application instance 1 (400) and application instance 2 (402) are deployed on an application cluster (450). Application instance 1 (400) includes MDB 1 (406) and application instance 2 (402) includes MDB 2 (410). Further, JMSRA 1 (404) is connected to application instance 1 (400) and JMSRA 2 (408) is connected to application instance 2 (402).

Further, since the total number of application instances deployed on the application cluster (450) is two, a variable indicating a total instance count with a value of two is stored on MDB 1 (406) and MDB 2 (410). Continuing with the example, the instance identifier for application instance 1 (400) has a value of zero and the instance identifier for application instance 2 (402) has a value of one.

In the example shown in FIG. 4A, consider the scenario in which application instance 1 (400) and application instance 2 (402) are instances of an application for reordering sold items to restock inventory. Each application instance (e.g., application instance 1 (400), application instance 2 (402)) subscribes (412, 414) to the topic (454) to receive JMS messages that are generated in response to a "generation of a new sales invoice" event.

Figure 4B:
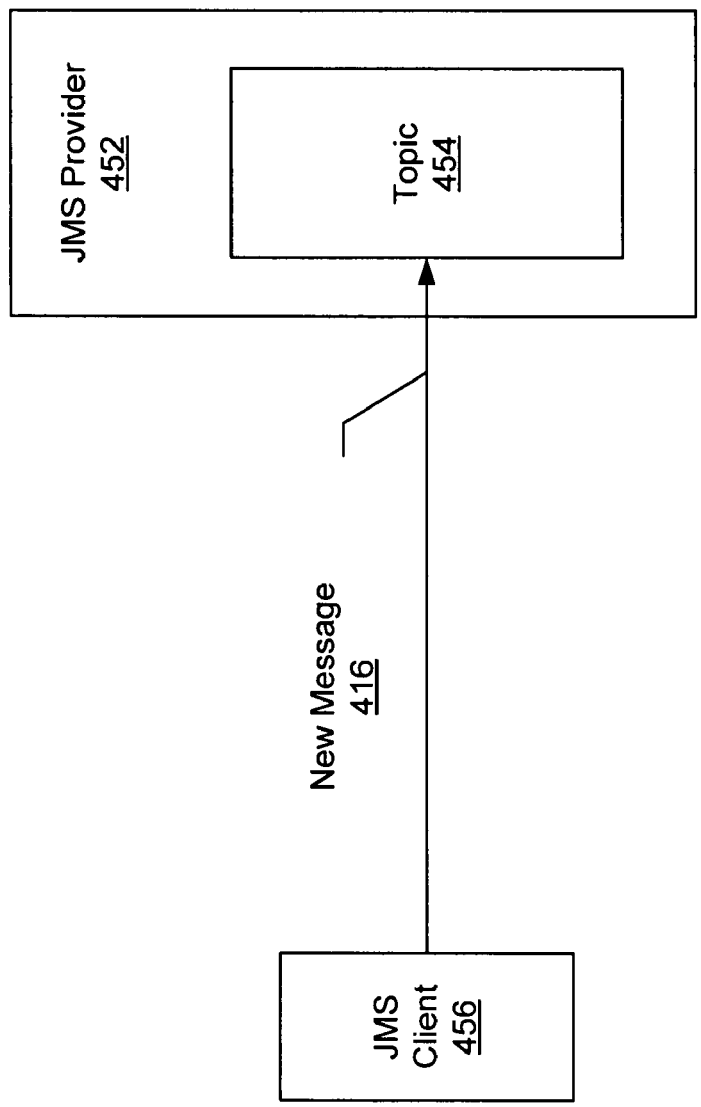

Continuing with the example to FIG. 4B, when a new sales invoice event occurs, a new JMS message (416) is published by the JMS client (456) to the topic (454). The JMS Provider (452) may add a timestamp value of "500" in the application instance selection portion of the new JMS message (416).

Figure 4C:
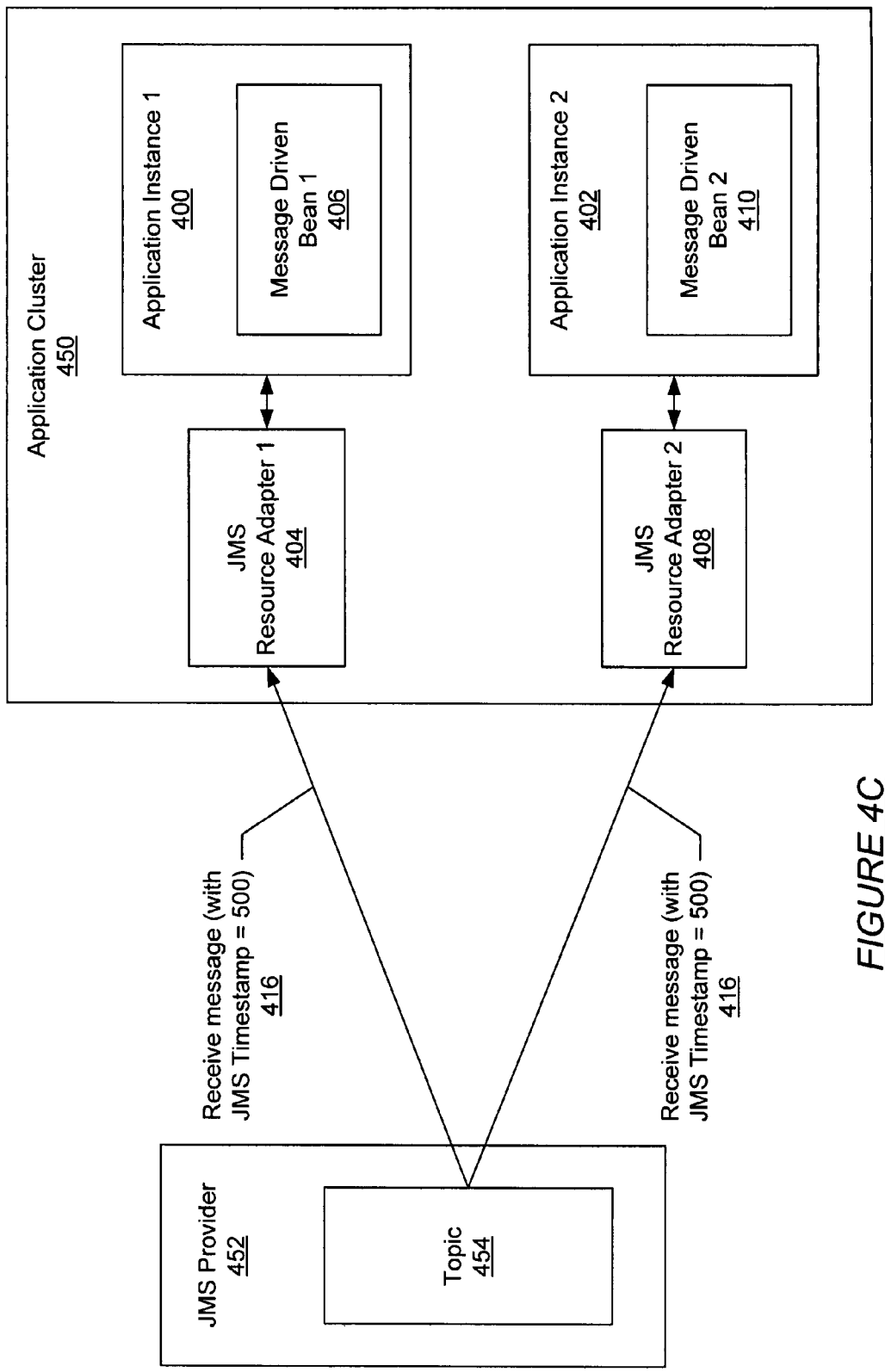

As shown in the example FIG. 4C, the JMS message is broadcast to the subscribers (i.e., application instance 1 (400), application instance 2 (402)) of the topic (454). Accordingly, the JMS message (416) may be asynchronously received by JMSRA 1 (404) and JMSRA 2 (408).

Figure 4D:
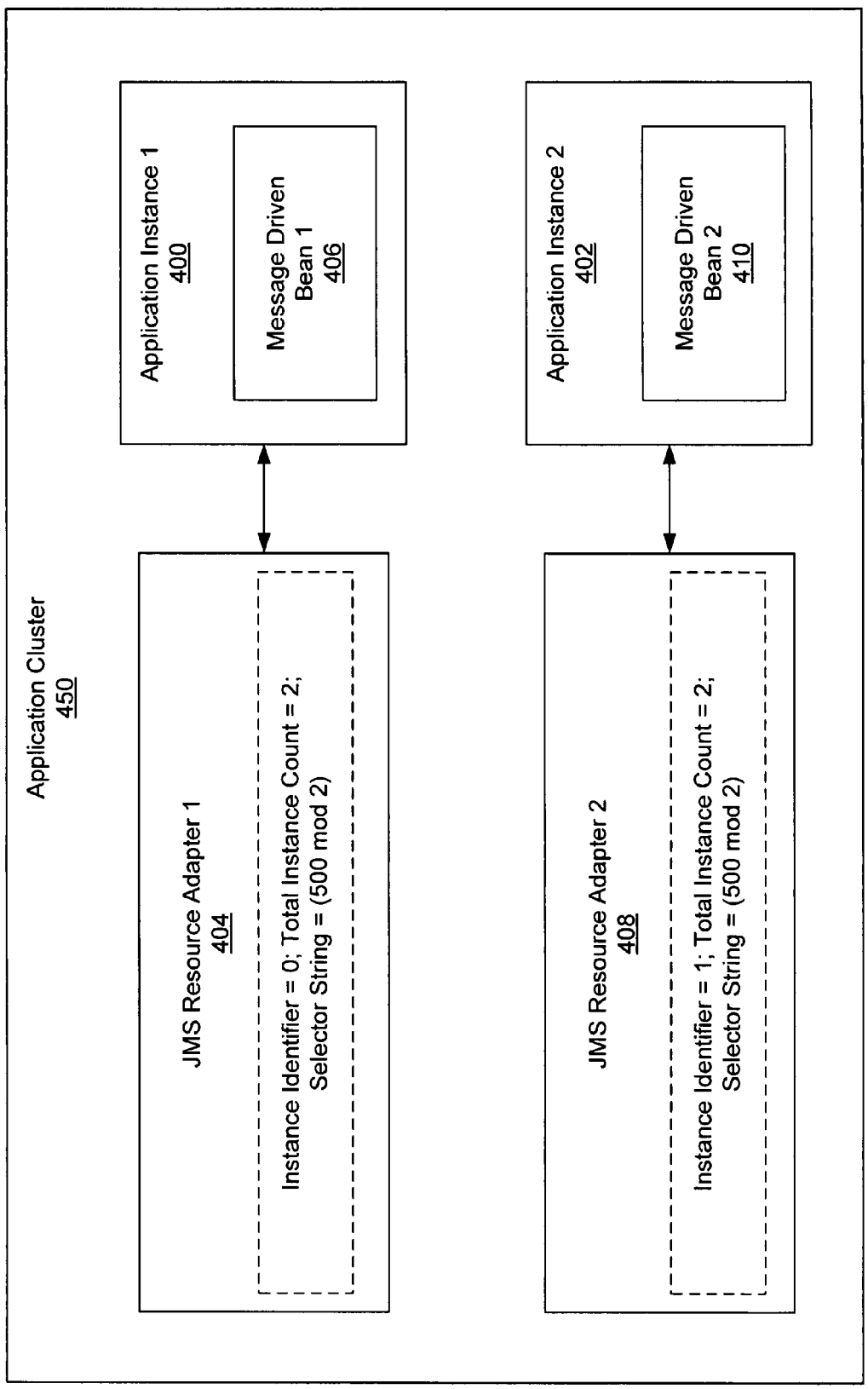

FIG. 4D shows an example calculation that may be performed by each JMSRA upon receipt of the JMS message in accordance with one or more embodiments of the invention. Once the JMS message (416) is received by a JMSRA (e.g., JMSRA 1 (404), JMSRA 2 (408)), the JMSRA (e.g., JMSRA 1 (404), JMSRA 2 (408)) calculates a selector string by performing a mod operation using the total instance count (i.e., 2) and the timestamp value (i.e., 500) included in the application instance selection portion of the JMS message (416). As discussed above, virtually any form of an application instance selection portion may be used to identify whether the corresponding application instance (i.e., application instance 1 (400), application instance 2 (402)) should process the JMS message.

Continuing with the example, the calculation yields a result of zero (500 mod 2=0), which is equal to the instance identifier of application instance one (400). Thus, JMSRA 1 (404) transmits the JMS message (416) to application instance 1 (400) for processing and JMSRA 2 (408) discards the JMS message (416). After application instance 1 (400) receives the JMS message, application instance 1 (400) processes the JMS message resulting in the items included on the sales invoice to be re-ordered from a pre-defined supplier. Accordingly, the client is sent new products to replace the sold products.

Figure 5:
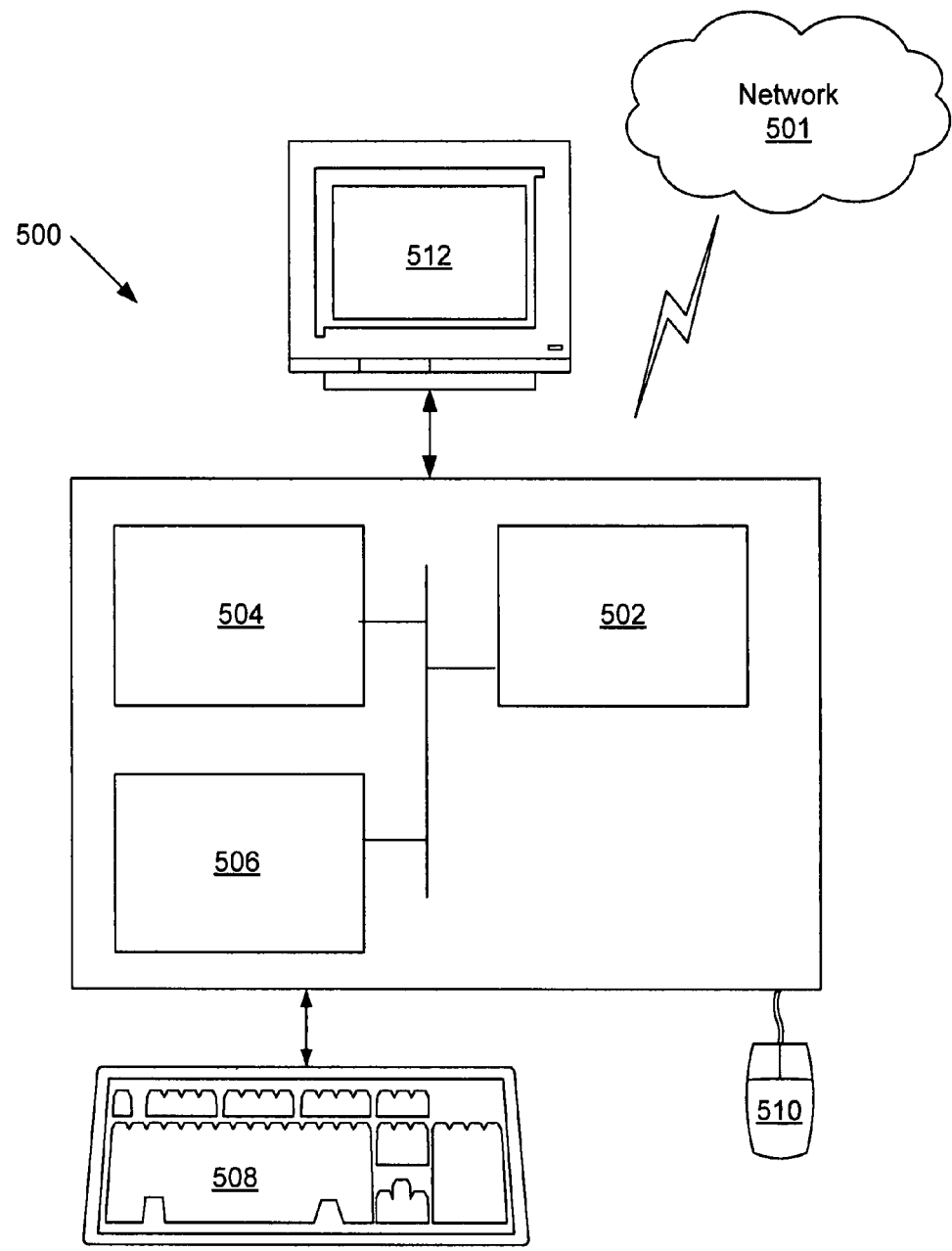
FIG. 5 shows a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (501) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., a client, a message provider, an application cluster, etc.) may be located on a different node within the distributed system. In one embodiment of the invention, the node may be a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

One or more embodiments of the invention achieve mutual exclusion in processing messages without communication between the application instances or the RAs. In particular, once the instance identifier and the total number of instances are known, each RA may determine, without communication, whether an application instance should process the message.

Furthermore, one or more embodiments of the invention create a technique for mutually exclusive processing of message without modifying the code in the application instance. Specifically, in one or more embodiments of the invention, the RA acts as a plug-in to the application instance.

Additionally, one or more embodiments of the invention provide a form of load balancing for processing messages. Specifically, when the application instance selection portion is a random variable, such as a timestamp, the distribution of messages to the application instances provides a type of load balancing as the message processing load is randomly distributed among the application instances. Further, in one or more embodiments of the invention, if a predictable attribute is chosen as the application instance selection portion, then the distribution of messages may be predictable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing messages directed to a topic, comprising:
receiving a first message by a plurality of resource adapters (RA),
wherein each RA of the plurality of RAs corresponds to a different application instance of a plurality of application instances,
wherein each RA of the plurality of RAs corresponds to a unique identifier,
wherein each RA of the plurality of RAs is configured to send a subscription request for the topic on behalf of the different application instance of the plurality of application instances, and
wherein each of the plurality of application instances is an instance of a single application;
based on determining that a selection flag is set to indicate that mutual exclusion logic among the plurality of RAs is enabled:
calculating, by each RA of the plurality of RAs, a first selector string by performing a modulo operation of an application instance selection portion of the first message by a total count of the plurality of application instances;
determining, by each RA of the plurality of RAs, whether the first selector string calculated by the RA is equal to the unique identifier corresponding to the RA;
transmitting the first message, by each RA of the plurality of RAs, to an application instance corresponding to the RA when the first selector string calculated by the RA is equal to the unique identifier corresponding to the RA; and
discarding the first message, by each RA of the plurality of RAs, when the first selector string calculated by the RA is not equal to the unique identifier corresponding to the RA,
wherein, according to the mutual exclusion logic, a single RA of the plurality of RAs transmits the first message to the application instance corresponding to the RA and the remaining RAs of the plurality of RAs discard the first message.

2. The method of claim 1, further comprising:
subscribing, by the plurality of application instances, to the topic, wherein the topic transmits the first message.

3. The method of claim 1, wherein the plurality of application instances is deployed on at least one application server.

4. The method of claim 1, wherein the application instance selection portion is a timestamp value.

5. The method of claim 1, further comprising, after transmitting the first message:
changing the selection flag to indicate that the mutual exclusion logic among the plurality of RAs is disabled;
receiving a second message by the plurality of RAs;
based on determining that the selection flag is set to indicate that the mutual exclusion logic among the plurality of RAs is disabled:
obtaining custom selection logic from a message handler of the application instance;
calculating a second selector string using the custom selection logic;
determining, by each RA of the plurality of RAs, whether the second selector string is equal to the unique identifier corresponding to the RA;
transmitting the second message, by each RA of the plurality of RAs, to the application instance corresponding to the RA when the second selector string is equal to the unique identifier corresponding to the RA; and
discarding the second message, by each RA of the plurality of RAs, when the second selector string is not equal to the unique identifier corresponding to the RA.

6. The method of claim 1, further comprising, after transmitting the first message:
changing the selection flag to indicate that the mutual exclusion logic among the plurality of RAs is disabled;
receiving a second message by the plurality of RAs;
based on determining that the selection flag is set to indicate that the mutual exclusion logic among the plurality of RAs is disabled:
transmitting the second message, by each RA of the plurality of RAs, to the application instance corresponding to the RA.

7. A system for processing messages, the system comprising:
a processor;
a plurality of application instances, wherein each application instance of the plurality of application instances corresponds to a different resource adapter (RA) of a plurality of RAs; and
the plurality of RAs, wherein each RA of the plurality of RAs corresponds to a unique identifier and is configured to:
receive a first message comprising an application instance selection portion;
based on determining that a selection flag is set to indicate that mutual exclusion logic among the plurality of RAs is enabled:
calculate a first selector string by performing a modulo operation of the application instance selection portion of the first message by a total count of the plurality of application instances;
determine whether the first selector string is equal to the unique identifier corresponding to the RA;
transmit the first message to the application instance corresponding to the RA when the first selector string is equal to the unique identifier corresponding to the RA; and
discard the first message when the first selector string is not equal to the unique identifier corresponding to the RA,
wherein, according to the mutual exclusion logic, a single RA of the plurality of RAs transmits the first message to a corresponding application instance of the plurality of application instances, and the remaining RAs of the plurality of RAs discard the first message,
wherein the first message is directed to a topic,
wherein each RA of the plurality of RAs is configured to send a subscription request for the topic on behalf of the corresponding application instance of the plurality of application instances,
wherein each of the plurality of application instances is an instance of a single application,
wherein at least one of the plurality of RAs is executing on the processor, and wherein at least one of the plurality of application instances is executing on the processor.

8. The system of claim 7, further comprising:
the topic configured to transmit the first message, wherein the plurality of application instances subscribes to the topic.

9. The system of claim 7, wherein each RA of the plurality of RAs is further configured to:
change the selection flag to indicate that the mutual exclusion logic among the plurality of RAs is disabled;
receive a second message by the plurality of RAs;
based on determining that the selection flag is set to indicate that the mutual exclusion logic among the plurality of RAs is disabled:
obtain custom selection logic from a message handler of the application instance corresponding to the RA;
calculate a second selector string using the custom selection logic;
determine whether the second selector string is equal to the unique identifier corresponding to the RA;
transmit the second message to the application instance corresponding to the RA when the second selector string is equal to the unique identifier corresponding to the RA; and
discard the second message when the second selector string is not equal to the unique identifier corresponding to the RA.

10. The system of claim 7, wherein the application instance selection portion is a timestamp value.

11. The system of claim 7, wherein each RA of the plurality of RAs is further configured to, after transmitting or discarding the first message:
change the selection flag to indicate that the mutual exclusion logic among the plurality of RAs is disabled;
receive a second message by the plurality of RAs;
based on determining that the selection flag is set to indicate that the mutual exclusion logic among the plurality of RAs is disabled:
transmit the second message to the application instance corresponding to the RA.

12. A non-transitory computer readable medium comprising software instructions embodied therein for causing a computer system to:
receive a first message directed to a topic by a plurality of resource adapters (RA) each corresponding to a unique identifier, wherein each RA of the plurality of RAs corresponds to a different application instance of a plurality of application instances, and wherein each RA of the plurality of RAs is configured to send a subscription request for the topic on behalf of the different application instance of the plurality of application instances;
based on determining that a selection flag is set to indicate that mutual exclusion logic among the plurality of RAs is enabled:
calculate, by each RA of the plurality of RAs, a first selector string by performing a modulo operation of a portion of the first message by a total count of the plurality of application instances;
determine, by each RA of the plurality of RAs, whether the first selector string calculated by the RA is equal to the unique identifier corresponding to the RA;
transmit the first message, by each RA of the plurality of RAs when the first selector string calculated by the RA is equal to the unique identifier corresponding to the RA,
wherein, according to the mutual exclusion logic, a single RA of the plurality of RAs processes the first message and the remaining RAs of the plurality of RAs do not process the first message,
wherein each of the plurality of application instances is an instance of a single application,
wherein the first message does not include information specific to the one RA processing the first message, and
wherein the single RA does not communicate with the remaining RAs in calculating the selector string.

13. The non-transitory computer readable medium of claim 12, wherein the first message is received from the topic according to a publish-subscribe model.

14. The non-transitory computer readable medium of claim 12,
wherein each application instance of the plurality of application instances comprises the unique identifier corresponding to the associated RA, and
wherein the software instructions to process the first message, by each RA of the plurality of RAs further comprise software instructions to transmit the first message to the associated application instance.

15. The non-transitory computer readable medium of claim 12, wherein the portion of the first message used for calculating the first selector string comprises a timestamp value.

16. The non-transitory computer readable medium of claim 12, further comprising software instructions for causing the computer system to, after transmitting the first message:
change the selection flag to indicate that the mutual exclusion logic among the plurality of RAs is disabled;
receive a second message by the plurality of RAs;
based on determining that the selection flag is set to indicate that the mutual exclusion logic among the plurality of RAs is disabled:
transmit the second message by each RA of the plurality of RAs.

* * * * *